United States Patent [19]

Vermeulen et al.

[11] Patent Number: 4,912,142
[45] Date of Patent: Mar. 27, 1990

[54] ANTISTATIC PHASE-SEGREGATED POLYURETHANES

[75] Inventors: Robbert M. Vermeulen, Concord, Calif.; Donald M. Maschmeyer, Lake Jackson, Tex.

[73] Assignee: The Dow Chemical Company, Midland, Mich.

[21] Appl. No.: 272,147

[22] Filed: Nov. 16, 1988

Related U.S. Application Data

[63] Continuation-in-part of Ser. No. 39,568, Apr. 15, 1987.

[51] Int. Cl.$^4$ .................................................. C08J 9/00
[52] U.S. Cl. .................................. 521/105; 521/107; 524/127; 524/141; 524/142; 524/143; 524/701; 524/710; 524/711; 524/712; 524/910; 524/912; 252/500
[58] Field of Search ............... 521/105, 107; 252/500, 252/1; 524/127, 141, 142, 143, 701, 710, 711, 712, 910, 912

[56] References Cited

U.S. PATENT DOCUMENTS

| | | | |
|---|---|---|---|
| 4,357,401 | 11/1982 | Andre et al. | 429/192 |
| 4,438,223 | 3/1984 | Hunter | 521/92 |
| 4,532,316 | 7/1985 | Henn | 528/59 |
| 4,617,325 | 10/1986 | Knobel et al. | 521/105 |
| 4,618,630 | 10/1986 | Knobel et al. | 521/105 |
| 4,621,113 | 11/1986 | Collins | 524/196 |
| 4,806,571 | 2/1989 | Knobel et al. | 521/107 |

*Primary Examiner*—John Kight
*Assistant Examiner*—Samuel A. Acquah
*Attorney, Agent, or Firm*—Carol J. Cavender

[57] ABSTRACT

This invention is an antistatic thermoplastic, phase-segregated polyurethane containing, as an antistatic additive an effective amount of a monovalent metal tetraphenylboron salt, in the substantial absence of a fatty acid salt, a $C_6$–$C_{30}$ carboxylic acid ester or phosphate ester compound.

Suprisingly, it has been found that, with this particular type of polyurethane, tetraphenylboron salts are very effective antistatic additives even in the absence of enhancer compounds as were previously employed. Accordingly, the antistatic polyurethane is useful for applications such as electronics components and packaging, and other applications where static dissipative ability is needed or desirable.

14 Claims, No Drawings

ANTISTATIC PHASE-SEGREGATED POLYURETHANES

CROSS REFERENCE TO RELATED APPLICATION

This application is a continuation-in-part of application Ser. No. 039,568 filed Apr. 15, 1987, pending.

BACKGROUND OF THE INVENTION

This invention relates to phase-segregated polyurethanes containing certain tetraphenylboron salts as antistatic additives.

Phase-segregated polyurethanes are useful in a variety of applications such as blood bags, catheters and other medical uses, as well as for films, packaging, and the like. Because of their excellent physical properties, they would also be excellent packaging materials for devices such as electronics components. However, electronics components and similar devices are often quite sensitive to damage from static electrical discharges, and their packaging must usually have the ability to dissipate static charges. Previously known phase-segregated polyurethanes have not had the requisite antistatic behavior.

It has recently been discovered that the incorporation of certain ionizable salts into the polyurethane could improve its antistatic properties. However, the use of these salts has been limited to certain types of polyurethanes or has required the use of an enhancer compound, as described in U.S. Pat. No. 4,618,630. Although excellent antistatic properties are obtained with the use of the enhancer compounds, these compounds do tend to affect the physical properties of the polyurethane. Often, the enhancers are plasticizers which tend to decrease the tensile properties of the polyurethane and increase its elongation. This is especially true with thermoplastic polyurethanes. Accordingly, it would be desirable to provide an antistatic polyurethane, particularly a thermoplastic polyurethane, in which an enhancer compound is not required.

SUMMARY OF THE INVENTION

This invention is an antistatic, thermoplastic, phase-segregated polyurethane containing, as an antistatic additive an effective amount of a monovalent metal tetraphenylboron salt, in the substantial absence of a fatty acid salt, a $C_6$–$C_{30}$ carboxylic acid ester or phosphate ester compound.

Surprisingly, it has been found that with this particular type of polyurethane tetraphenylboron salts are very effective antistatic additives, even in the absence of enhancer compounds as were previously employed. Accordingly, excellent antistatic behavior is seen using very low levels of tetraphenylboron salt. In addition, the alterations in physical properties sometimes seen with the use of enhancer compounds are not seen with this invention, due to the absence of such compounds.

DETAILED DESCRIPTION OF THE INVENTION

In this invention, an antistatic thermoplastic, phase-segregated polyurethane contains as the antistatic additive a monovalent metal tetraphenylboron salt.

The monovalent metal tetraphenylboron salt used herein is any salt of a monovalent metal and the tetraphenylboron anion. The monovalent metal is preferably one in Group I of the Periodic Table of the Elements (alkali metal) and is more preferably potassium or sodium. Sodium tetraphenylboron is most preferred.

The monovalent metal tetraphenylboron salt is dissolved in the thermoplastics, phase-segregated polyurethane in an amount sufficient to render the polymer antistatic. For the purposes of this invention, the polyurethane is considered antistatic if it is capable of dissipating 99% of an applied static charge of 5000 volts (direct current) within 10, preferably within about 4, more preferably within about 2 seconds, or 90% of an applied static charge of 5000 volts (direct current) within about 4, preferably within 1.6, more preferably within 0.8 seconds, as measured by Federal Test Method 101C, Method 4046, omitting the water step as suggested in the Electronics Industry Association Interim Standard IS-5.

A suitable amount of the metal tetraphenylboron salt, which provides good antistatic properties, is from about 0.03 to about 5, preferably about 0.2 to about 3, more preferably about 0.1 to about 1 weight percent, based on the weight of the polyurethane. In most instances, levels below those indicated in these ranges yield insufficient antistatic behavior to the polyurethane, while greater amounts do not provide significantly better antistatic properties and are therefore unnecessary.

The thermoplastic, phase-segregated polyurethne of this invention is advantageously the reaction product of a primary hydroxyl-terminated polyether, a diisocyanate and a difunctional "chain extender". Such polyurethanes are described in U.S. Pat. No. 4,621,113.

The polyether used in preparing the polyurethane advantageously has an equivalent weight from about 700 to about 3000, preferably from about 800 to about 2000. It is advantageously prepared by polymerizing an $\alpha,\beta$-unsaturated alkylene oxide, tetrahydrofuran or other cyclic compound capable of undergoing a ring-opening reaction to form a polyether, in the presence of a polyhydric initiator. Preferably, a $C_2$–$C_6$ alkylene oxide is polymerized. Most preferably, the polyether is a polymer of ethylene oxide and/or propylene oxide. In all instances in which a monomer is used which gives rise to secondary hydroxyl groups, it is necessary to further react the polyether with another initiator which provides terminal hydroxyl groups, such as ethylene oxide. Such end-capping should proceed to an extent such that at least about 50, more preferably at least about 70, percent of the terminal hydroxyl groups are primary. The most preferred polyether is a polymer of propylene oxide or mixture thereof with ethylene oxide which is end-capped with ethylene oxide so that the polyether contains about 10–25 weight percent poly(ethylene oxide) end groups.

Suitable polyhydric initiators have from about 2–4, preferably about 2–3, and more preferably about 2, active hydrogen atoms per molecule. Suitable dihydric initiators include water, ethylene glycol, diethylene glycol, triethylene glycol, propylene glycol, dipropylene glycol, tripropylene glycol, methyldiethanolamine, ethyldiethanolamine, methyldiisopropanolamine, ethyldiisopropanolamine, low equivalent weight polypropylene oxide glycols, and the like. Trihydric initiators include glycerine, trimethylolpropane, ammonia, triethanolamine, triisopropanolamine and the like. Other, higher functional initiators include ethylene diamine, pentaerythritol, sucrose, sorbitol and the like.

Both aliphatic and aromatic diisocyanates are useful in this invention. However, certain salts of the tetraphenylboron tend to catalyze the trimerization reaction of more reactive polyisocyanates. For this reason, aliphatic polyisocyanates are generally preferred.

Suitable aromatic diisocyanates include, for example, m-phenylene diisocyanate, p-phenylene diisocyanate, 2,4- and/or 2,6-toluene diisocyanate (TDI), naphthylene-1,5-diisocyanate, 1-methoxypehnyl-2,4-diisocyanate, 4,4'-biphenylenediisocyanate, 3,3'-dimethoxy-4,4'biphenyldiisocyahnate, 2,4'- and/or 4,4'-diphenylmethanediisocyanate (MDI) and substantially difunctional derivatives thereof. Preferred among the aromatic polyisocyanates are the isomers and derivatives of TDI and MDI.

Exemplary aliphatic polyisocyanates include isophorone diisocyanate, cyclohexane diisocyanate, hydrogenated diphenylmethanediisocyanate ($H_{12}MDI$), 1,6-hexamethylenediisocyanate and the like. Of these, hexamethylenediisocyanate and $H_{12}MDI$ are most preferred.

Biuret, urethane, urea, uretonimine and/or carbodiimide containing derivatives of the foregoing polyisocyanates are also suitable.

A chain extender is also used in the preparation the phase-segregated polyurethane. The chain extenders useful herein are relatively low equivalent weight compounds (i.e., less that about 250 equivalent weight) having about two active hydrogen-containing groups per molecule. Preferably, the chain extender is an $\alpha,\beta$-alkylene glycol or glycol ether having an equivalent weight of less than about 200. Particularly preferred chain extenders include ethylene glycol, diethylene glycol, 1,4-butanediol, triethylene glycol and the like.

In preparing the polyurethane, the polyisocyanate is employed in an amount to provide about 0.9 to about 1.2, preferably about 1.0 to about 1.15, more preferably about 1.0 to about 1.1 isocyanate groups per active hydrogen-containing group present in the reaction mixture. Lesser amounts of polyisocyanate produce an inadequately cured polymer whereas greater amounts thereof tend to form undesirable crosslinking.

The relative amounts of the relatively high equivalent weight polyether and the chain extender may vary according to the desired properties of the polyurethane. Generally, increasing the relative proportion of chain extender produces a stiffer polyurethane. Preferably, about 5 to about 60, more preferably about 10 to about 40 parts by weight of chain extender are used per 100 parts by weight of the relatively high equivalent weight polyether.

The polyurethane can be prepared from the foregoing reactive components in either a one-shot process or by a two-shot, or prepolymer, process.

In the one-shot process, the polyisocyanate is simultaneously reacted with the polyether and the chain extender. In such one-shot process, it is conventional to mix together all the reactive components and additives as described hereinafter except the polyisocyanate, and then react said mixture with the polyisocyanate. This permits the introduction of only two streams of material to the mold or reaction vessel. Occasionally, certain of the non-reactive additives may be mixed with the polyisocyanate. Alternatively, the various components may also be separately introduced into the mold or reaction vessel, or may be added in three or more streams.

In the two-shot process, all or a major portion of the polyether is reacted with an excess of polyisocyanate in a first step to form a prepolymer or quasi-prepolymer. This prepolymer or quasi-prepolymer is then reacted with the chain extender and any remaining polyether to form the polyurethane polymer. A stoichiometric excess of the polyisocyanate is used in making the prepolymer or quasi-prepolymer. Advantageously, the resulting prepolymer or quasi-prepolymer has an isocyanate equivalent weight from about 250 to about 600, more preferably from about 250 to about 450.

The reaction of the polyisocyanate and the polyether is advantageously conducted at an elevated temperature in the presence of a catalyst as described hereinafter. The preparation of the prepolymer is advantageously conducted at a temperature of about 60°-100° C. for a time sufficient for substantially all of the active hydrogen-containing groups to react with the polyisocyanate. About 3 minutes to about 5 hours are generally sufficient for this purpose.

The resulting prepolymer or quasi-prepolymer is then reacted with the chain extender. Additional amounts of the polyether may also be present during this reaction, but such amounts are minor compared with the amount of polyether used in preparing the prepolymer. This reaction is advantageously catalyzed and carried out at an elevated temperature, such as about 25 up to the degradation temperature of the prepolymer, preferably about 30° to about 260° C., more preferably about 30 to about 230° C. The reaction of the prepolymer or quasi-prepolymer with the chain extender is typically carried out in a mold or an extruder. In order to maximize the use of the mold, it is common practice to cure the polyurethane in the mold only until it is sufficiently cured to maintain its shape. At that point, the typical practice is to demold the polyurethane and post-cure it outside the mold. Such post-curing, when done, is typically conducted for about 30 minutes to about 24 hours at a temperature of about 40°-120° C. Such post-curing is not critical, however, and complete in-mold curing or room temperature post-cure may also be used.

The tetraphenylboron salt may be incorporated into the polyurethane in a number of ways. One method is to blend the salt, neat or as a solution in a suitable solvent, with the cured polyurethane. In this method, the polyurethane is advantageously contacted with the salt or salt solution while in a particulate or molten state. Preferably, the polyurethane is melted in an extruder, roller mill, or similar apparatus, contacted with the salt or salt solution while in the molten state, and then extruded to provide a homogenous blend. In this process, any solvent is advantageously flashed off. When the salt or salt solution is contacted with a particulate polyurethane, it is preferred to extrude the mixture to improve homogenity.

Suitable solvents are compounds or mixture of compounds which are miscible with the molten polyurethane, having boiling points below the decomposition temperature of the polyurethane and which are good solvents for the tetraphenylboron salt. Water, low molecular weight alcohols such as methanol and ethanol, low equivalent weight ketones such as acetone and methyl ethyl ketone, and the like are useful solvents.

Alternatively, the tetraphenylboron salt may be incorporated into the polyurethane by mixing it into one of the reactive components during the formation of the polyurethane. Using this approach, the tetraphenylboron salt, or solution thereof, is blended with one or more of the reactive components used in making the polyurethane prior to the making of the polyurethane itself. Advantageously the salt is blended with the polyether or prepolymer prepared therefrom, or more preferably, with the chain extender as described in copending application Ser. No. 938,222, filed Dec. 5, 1986. If a solvent is used in blending the salt with the reactive component, it is advantageously removed prior to formation of the polyurethane.

In addition to the reactive components and the tetraphenylboron salt, various other additives are advantageously employed in the preparation of the polyurethane. Catalysts for the reaction of the polyether and chain extender with the polyisocyanate are advantageously used. Preferred catalysts include organometallic catalysts, especially organotin catalysts, and tertiary amine compounds. The preferred organotin catalysts include, for example, stannous octoate, dimethyltindilaurate, dibutyltindilaurate and the like. Suitable tertiary amine catalysts include triethylenediamine. About 0.001 to about 0.5 part of the organometallic catalyst is advantageously used per 100 parts of reactive components. Tertiary amine catalysts are suitably employed in an amount from about 0.01 to about 2 parts per 100 parts of reactive components. Of course, other catalysts useful in catalyzing polyurethane reactions are also useful herein.

Other optional additives include pigments, fillers, reinforcing fibers, mold release agents, antioxidants, preservatives, blowing agents, surfactants and the like are also useful and may be employed if desired.

As stated before, a $C_6$–$C_{30}$ carboxylic acid ester, a fatty acid salt and a phosphate ester are substantially absent from the reaction mixture. The term "substantial absence" is used to denote the presence of insufficient amounts of such esters and/or salts to substantially increase the conductivity of the polymer containing the tetraphenylboron salt. A salt or ester is considered not to substantially increase the conductivity of a polymer containing the tetraphenylboron salt if the conductivity of the polymer containing the tetraphenylboron salt and carboxylic ester, fatty acid salt or phosphate ester is not more than five times that of the polymer containing the tetraphenylboron salt alone. Specifically, there is less than about 0.5 moles of carboxylic ester, fatty acid salt and phosphate ester per mole of tetraphenylboron salt. However, these materials may be used in very small amounts, i.e., 1 or less part per 100 parts relatively high equivalent weight polyol, as, for example surfactants. Most preferably, essentially none of these materials are present.

The antistatic thermoplastic, phase-segregated polyurethane of this invention is useful in many applications in which the dissipation of static electrical charges is desired. Such applications include, for example, electronics components packaging and cabinets.

The following examples are provided to illustrate the invention but are not intended to limit the scope thereof. All parts and percentages are by weight unless otherwise indicated.

EXAMPLE 1

A thermoplastic, phase-segregated polyurethane is prepared by charging 1 equivalent of a 2000 molecular weight ethylene oxide-capped poly(propylene oxide) diol to a suitable reactor and heating it at 135° C. while open to the air until it becomes water-white in appearance. The polyol is then dewatered at 135° C. at a pressure of less than 800 millitorr absolute. The polyol is then cooled to less than 80° C., and 4 equivalents of hydrogenated diphenylmethanediisocyanate ($H_{12}$MDI) are added with stirring. Tin octoate is then added as a catalyst, after which time an exotherm occurs, indicating a reaction between the diol and the diisocyanate is taking place. The resulting prepolymer is then cooled to below 40° C. In separate streams, the prepolymer, 3 equivalents of 1,4-butane diol and additional tin octoate are metered, passed through a static mixer into the feed throat for an extruder in which the materials react to provide a thermoplastic polyurethane polymer which is extruded at the die end of the extruder.

The polyurethane is pelletized and blended with sodium tetraphenylboron to provide the polymer with an amount of the tetraphenylboron salt as indicated in the following Table 1. The blend is then re-extruded in order to ensure complete mixing, and formed into cast films. The static decay time and tensile strength of each film, and is measured and are as reported in the following Table 1.

TABLE 1

| Sample Number | NaPh4B content, %[1] | Static Decay Time, sec.[2] | Tensile Strength, psi[3] |
|---|---|---|---|
| 1 | 0.25* | 0.52 | 4736 |
| 2 | 0.25 | 0.1 | 4057 |
| 3 | 0.20 | 0.18 | 4129 |
| 4 | 0.15 | 0.27 | 4143 |
| 5 | 0.10 | 0.89 | 3964 |
| 6 | 0.05 | 1.0 | 3676 |
| A** | 0 | Infinite | 4221 |

*Also contains 0.1% of a stearyl-stearamide antiblock/slip additive.
**Not an example of this invention.
[1] Expressed in weight percent, based on the weight of the polymer.
[2] Federal Test Method 101C, Method 4046, omitting the water step as suggested in the Electronics Industry Association Interim Standard IS-5. The time reported is that required to dissipate 90% of an applied 5000 VDC charge. Infinite means the sample carries an initial charge which cannot be dissipated.
[3] ASTM D-412.

As can be seen from the data in the foregoing Table, excellent static dissipative ability is provided using very low levels of the tetraphenylboron salt, with no significant effect on physical properties.

EXAMPLE 2

A series of phase-segregated thermoplastic polyurethanes Samples No. 7–11) is prepared in the manner described in Example 1 except the equivalent ratios of polyol:polyisocyanate:chain extender are 1:6:5, and in the chain extender is dissolved sodium tetraphenylboron or a mixture thereof with a glycol or glycol ether solvent. The sodium tetraphenylboron/solvent mixtures used are:

25% sodium tetraphenylboron in tetramethylene glycol dimethylether (Sample No. 8);

25% sodium tetraphenylboron in a 350 molecular weight monoethylpolyethylene glycol (Sample Nos. 9–11).

The amount of the sodium tetraphenylboron or mixture thereof used is sufficient to provide the polyurethane with a level of sodium tetraphenylboron as indicated in Table 2.

In Sample No. 7, no solvent is used, but the polyurethane contains 0.075% of a stearyl-stearmide antiblock/slip additive.

After the polyurethane is prepared, it is reextruded and cast into a film. The ability of the film to dissipate a static charge is measured, with results as indicated in Table 2.

TABLE 2

| Sample No. | NaPh$_4$B level | Static Decay Time, sec.[1] |
| --- | --- | --- |
| 7 | 0.25 | 0.09 |
| 8 | 0.1 | 8.0 |
| 9 | 0.1 | 9.5 |
| 10 | 0.1 | 5.0 |
| 11 | 0.2 | 3.3 |

[1]See note 2 of Table 1

What is claimed is:

1. An antistatic thermoplastic, phase-segregated polyurethane containing an antistatic additive consisting essentially of an effective amount of a monovalent metal tetraphenylboron salt.

2. The antistatic polyurethane of claim 1 wherein the monovalent metal tetraphenylboron salt is sodium tetraphenylboron.

3. The antistatic polyurethane of claim 2 wherein the antistatic additive is present in an amount from about 0.2 to about 3 weight percent, based on the weight of the polyurethane.

4. The antistatic polyurethane of claim 3 wherein the polyurethane is the reaction product of a primary hydroxyl-terminated polyether, a difunctional chain extender, and a diisocyanate.

5. The antistatic polyurethane of claim 4 wherein the polyether has an equivalent weight from about 800 to about 2000 and the chain extender comprises an $\alpha,\omega$-alkylene diol or a glycol ether.

6. The antistatic polyurethane of claim 5 wherein the diisocyanate is an aliphatic diisocyanate.

7. The antistatic polyurethane of claim 5 wherein the diisocyanate is an aromatic diisocyanate.

8. An antistatic thermoplastic, phase-segregated polyurethane, containing an antistatic additive consisting essentially of a monovalent metal tetraphenylboron salt, wherein said polyurethane is sufficiently antistatic to dissipate 90% of a static charge of 5000 volts of direct current within about 0.8 seconds.

9. The antistatic polyurethane of claim 8 wherein the monovalent metal tetraphenylboron salt consists essentially of sodium tetraphenylboron.

10. The antistatic polyurethane of claim 9 wherein the antistatic additive is present in an amount from about 0.2 to about 3 weight percent, based on the weight of the polyurethane.

11. The antistatic polyurethane of claim 10 wherein the polyurethane is the reaction product of a primary hydroxyl-terminated polyether, a difunctional chain extender, and a diisocyanate.

12. The antistatic polyurethane of claim 11 wherein the polyether has an equivalent weight from about 800 to about 2000 and the chain extender comprises an $\alpha,\omega$-alkylene diol or a glycol ether.

13. The antistatic polyurethane of claim 12 wherein the diisocyanate is an aliphatic diisocyanate.

14. The antistatic polyurethane of claim 12 wherein the diisocyanate is an aromatic diisocyanate.

* * * * *